United States Patent
Tamane et al.

(10) Patent No.: US 10,836,349 B2
(45) Date of Patent: Nov. 17, 2020

(54) REMOTE STARTUP SYSTEM, CENTER SERVER, VEHICLE, AND REMOTE STARTUP METHOD

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/990,108

(22) Filed: May 25, 2018

(65) Prior Publication Data

US 2018/0345907 A1 Dec. 6, 2018

(30) Foreign Application Priority Data

May 31, 2017 (JP) .................. 2017-108783

(51) Int. Cl.
*B60R 25/00* (2013.01)
*B60R 25/20* (2013.01)
(Continued)

(52) U.S. Cl.
CPC ............ *B60R 25/209* (2013.01); *B60R 25/04* (2013.01); *F02N 11/0807* (2013.01);
(Continued)

(58) Field of Classification Search
USPC .......................................................... 701/2
See application file for complete search history.

(56) References Cited

U.S. PATENT DOCUMENTS

2005/0234604 A1* 10/2005 Nakamura .......... B60R 16/0231
701/2
2016/0280182 A1* 9/2016 Geissenhoner ....... B60R 25/209
(Continued)

FOREIGN PATENT DOCUMENTS

JP 2005-329931 A 12/2005
JP 2013238184 A * 11/2013 .......... F02N 11/0807
(Continued)

OTHER PUBLICATIONS

OnStar Owner's Guide, Part # 25945307, OnStar Subscriber Services, Warren, MI 48090-1027, located at file:///C:/Users/scarlson/Documents/Patents/150990108%20Auto%20Startup/EN_OnStar_Gen9_Manual.pdf (Year: 2011).*

*Primary Examiner* — James M McPherson
(74) *Attorney, Agent, or Firm* — Hunton Andrews Kurth LLP

(57) ABSTRACT

A remote startup system includes a terminal, a center server configured to communicate with the terminal and receive a startup request from the terminal, and a vehicle on which a driving device is mounted, the vehicle being configured to communicate with the center server, receive the startup request from the center server, and start up the driving device. At least one of the center server and the vehicle includes a stop unit configured to stop the driving device of the vehicle when communication between the terminal and the center server or between the center server and the vehicle is disrupted in a case where the driving device is started up based on the startup request and being operated.

9 Claims, 9 Drawing Sheets

(51) Int. Cl.
  *F02N 11/08*  (2006.01)
  *H04W 4/40*  (2018.01)
  *B60R 25/04*  (2013.01)
  *F02N 11/10*  (2006.01)

(52) U.S. Cl.
  CPC ............... *F02N 11/10* (2013.01); *H04W 4/40* (2018.02); *F02N 2300/306* (2013.01)

(56) References Cited

U.S. PATENT DOCUMENTS

2016/0377508 A1* 12/2016 Perrone ................. G01M 17/06
  180/204
2018/0061147 A1* 3/2018 Bergmann ............. G07C 5/008

FOREIGN PATENT DOCUMENTS

JP    2013238184 A    11/2013
KR    20110004088 A *  7/2009

* cited by examiner

REMOTE STARTUP SYSTEM, CENTER SERVER, VEHICLE, AND REMOTE STARTUP METHOD

INCORPORATION BY REFERENCE

The disclosure of Japanese Patent Application No. 2017-108783 filed on May 31, 2017 including the specification, drawings and abstract is incorporated herein by reference in its entirety.

BACKGROUND

1. Technical Field

The present disclosure relates to a remote startup system, a center server, a vehicle, and a remote startup method.

2. Description of Related Art

A center type remote startup system that starts up a driving device such as an engine or an electric compressor (an electric motor) for air conditioning mounted on a vehicle in response to a startup request transmitted from a portable communication terminal device carried by a user to a vehicle remotely located via a center server has been known (see, for example, Japanese Unexamined Patent Application Publication No. 2013-238184 (JP 2013-238184 A)).

SUMMARY

However, in the center type remote startup system, when communication is disrupted between a communication terminal (hereinafter referred to as a "terminal") and a center server or between the center server and the vehicle, a user cannot perform a remote operation of the vehicle via the center server. Therefore, the user who uses the terminal at a place relatively distant from the vehicle is likely to be unable to stop the driving device described above in a case where the user desires to stop the driving device of the vehicle when communication is disrupted while the driving device is started up and operated based on a startup request for the driving device (hereinafter referred to as a "startup request").

The present disclosure provides a center type remote startup system, a center server, a vehicle, and a remote startup method capable of safely stopping a driving device of a vehicle even when an operation of stopping the driving device of the vehicle cannot be performed from a terminal due to communication disruption while the driving device is being started up based on a startup request and being operated.

A first aspect of the present disclosure relates to a remote startup system including: a terminal; a center server configured to communicate with the terminal and receive a startup request from the terminal; and a vehicle on which a driving device is mounted, the vehicle being configured to communicate with the center server, receive the startup request from the center server, and start up the driving device. At least one of the center server and the vehicle includes a stop unit configured to stop the driving device of the vehicle when communication between the terminal and the center server or between the center server and the vehicle is disrupted in a case where the driving device is started up based on the startup request and being operated.

According to the first aspect of the present disclosure, the driving device is automatically stopped when communication between the terminal and the center server or between the center server and the vehicle is disrupted in a case where the driving device is started up based on the startup request and being operated. Therefore, it is possible to safely stop the driving device even when an operation of stopping the driving device of the vehicle cannot be performed from the terminal due to communication disruption while the driving device is being started up based on the startup request and being operated.

In the remote startup system according to the first aspect of the present disclosure, at least one of the center server and the vehicle may include a communication availability determination unit configured to determine whether or not communication is available between the terminal and the center server or between the center server and the vehicle. In a case where the stop unit is provided in the center server, the communication availability determination unit may be provided in the center server, the communication availability determination unit configured to transmit periodically a request signal to the terminal, and determine whether or not communication is available between the terminal and the center server based on the presence or absence of a reply from the terminal in response to the request signal. In a case where the stop unit is provided in the vehicle, the communication availability determination unit may be provided in the vehicle, the communication availability determination unit configured to transmit a request signal to the center server, and determine whether or not communication is available between the center server and the vehicle based on the presence or absence of a reply from the center server in response to the request signal.

According to the first aspect of the present disclosure, it is possible to specifically determine whether or not communication is available between the terminal and the center server or between the center server and the vehicle by periodically transmitting the request signal requesting the reply from the center server to the terminal or from the vehicle to the center server.

In the remote startup system according to the first aspect of the present disclosure, the stop unit may be configured to determine whether or not to stop the driving device of the vehicle based on a determination result of the communication availability determination unit as to whether or not communication is available between the terminal and the center server or between the center server and the vehicle.

According to the first aspect of the present disclosure, in a case where a determination is made that communication is not available according to the determination as to the communication availability through periodic transmission of the request signal, it is possible to determine that the communication has been disrupted and stop the driving device of the vehicle.

In the remote startup system according to the first aspect of the present disclosure, the stop unit may be configured to stop the driving device of the vehicle in a case where the stop unit determines that the communication between the terminal and the center server or between the center server and the vehicle is disrupted based on a determination result of the communication availability determination unit and an elapsed time of the disruption of the communication has exceeded a predetermined threshold value.

According to the first aspect of the present disclosure, since the driving device is stopped after a certain time has elapsed from the disruption of the communication, a situation in which the driving device is stopped can be avoided, for example, in a case where the communication is temporarily disrupted and immediately restored.

In the remote startup system according to the first aspect of the present disclosure, the vehicle may include a controller configured to start up the driving device. The controller may be configured to permit startup of the driving device based on a command other than the startup request even in a case where the communication between the terminal and the center server or between the center server and the vehicle is disrupted.

According to the first aspect of the present disclosure, even in a case where the driving device is stopped due to occurrence of communication disruption, when the user goes near the vehicle, the engine of the vehicle can be started up using a command other than the startup request transmitted from the terminal, such as an ON operation of an ignition switch of the vehicle or a command from a remote control engine starter that directly transmits a command to the vehicle.

In the remote startup system according to the first aspect of the present disclosure, at least one of the center server and the vehicle may include a stop notification transmission unit configured to transmit a notification indicating that the driving device is stopped to the terminal when communication between the terminal and the center server or between the center server and the vehicle is restored in a case where the driving device is stopped by the stop unit.

According to the first aspect of the present disclosure, when the driving device has been stopped due to the communication disruption, the fact that the driving device has actually been stopped is transmitted from the center server or the vehicle to the terminal according to restoration of the communication. Accordingly, a user can confirm that the driving device has actually been stopped according to, for example, the notification displayed on a display of the terminal.

A second aspect of the present disclosure relates to a center server communicatably connected to a terminal and a vehicle, the center server being configured to receive a startup request that is transmitted from the terminal and start up a driving device mounted on the vehicle based on the startup request. The center server includes a stop unit configured to transmit a stop request to the vehicle and stop the driving device of the vehicle when communication between the terminal and the center server is disrupted in a case where the driving device is started up based on the startup request and being operated.

A third aspect of the present disclosure relates to a vehicle communicatably connected to a center server that is communicatable with a terminal, the vehicle being configured to start up a driving device mounted on the vehicle in response to a predetermined transmission signal from the center server based on a startup request transmitted from the terminal to the center server. The vehicle includes a stop unit configured to stop the driving device of the vehicle when communication between the center server and the vehicle is disrupted in a case where the driving device is started up based on the startup request and being operated.

A fourth aspect of the present disclosure relates to a remote startup method that is executed by a remote startup system including a terminal, a center server communicatable with the terminal, and a vehicle communicatable with the center server, the remote startup system being configured to start up a driving device mounted on the vehicle in response to a startup request transmitted from the terminal to the center server. The remote startup method includes stopping the driving device of the vehicle when communication between the terminal and the center server or between the center server and the vehicle is disrupted in a case where the driving device is started up based on the startup request and being operated.

According to the aspect of the present disclosure, it is possible to provide a center type remote startup system, a center server, a vehicle, and a remote startup method capable of safely stopping a driving device even when an operation of stopping the driving device of the vehicle cannot be performed from a terminal due to communication disruption while the driving device is started up and operated based on a startup request.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the disclosure will be described with reference to the drawings.

First Embodiment

Configuration of Remote Startup System

First, a configuration of a remote startup system 1 according to the embodiment will be described with reference to FIGS. 1 to 4.

Figure 1:
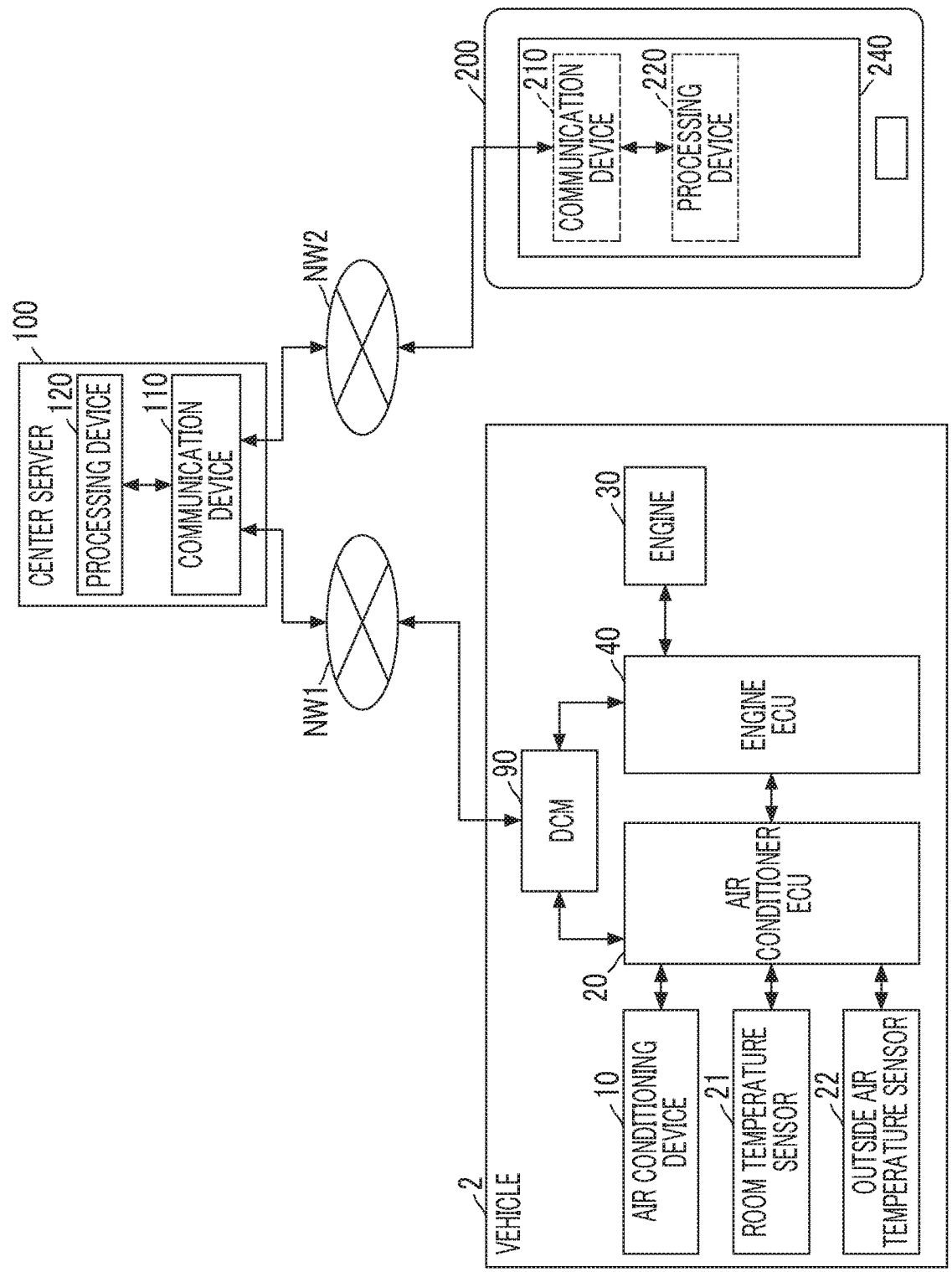
FIG. 1 is a configuration diagram illustrating an example of a configuration of a remote startup system.
Figure 2:
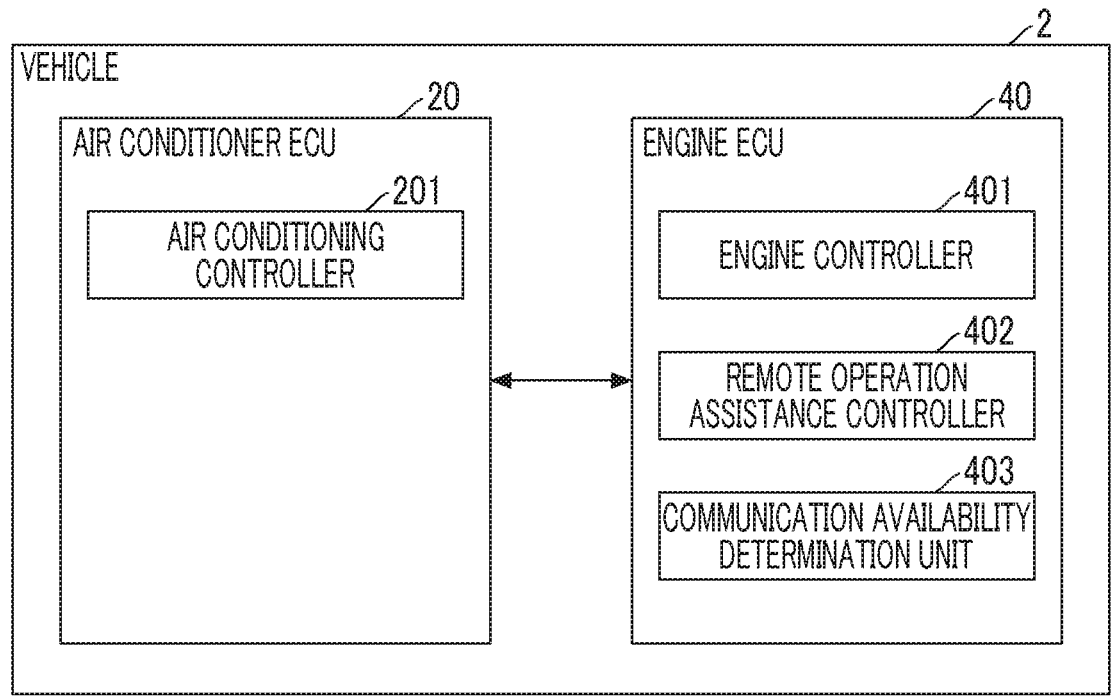
FIG. 2 is a functional block diagram illustrating an example of a functional configuration of a vehicle (an air conditioner ECU and an engine ECU) according to a first embodiment.
Figure 3:
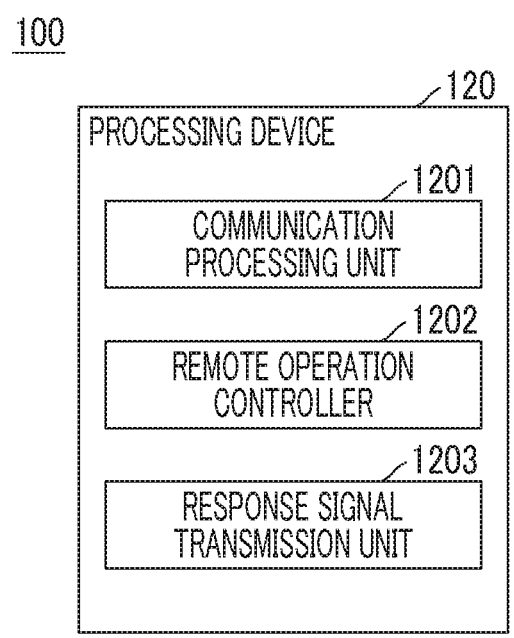
FIG. 3 is a functional block diagram illustrating an example of a functional configuration of a center server (a processing device) according to the first embodiment.
Figure 4:
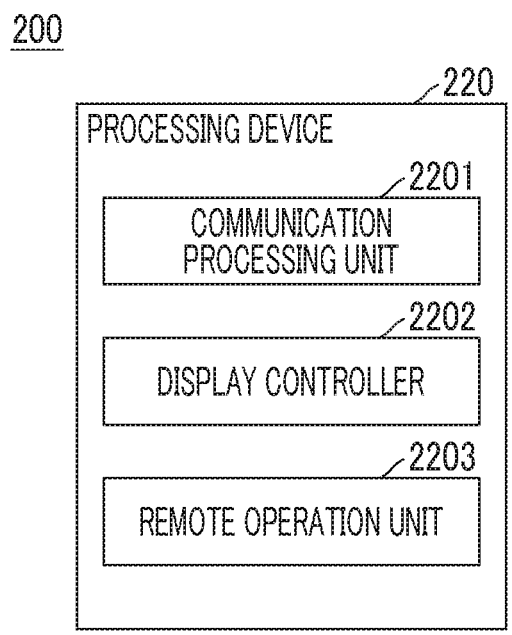
FIG. 4 is a functional block diagram illustrating an example of a functional configuration of a terminal (a processing device) according to the first embodiment.

FIG. 1 is a configuration diagram illustrating an example of a configuration of the remote startup system 1 according to the embodiment. FIG. 2 is a functional block diagram illustrating an example of a functional configuration of a vehicle 2 (an air conditioner ECU 20 and an engine ECU 40) according to the embodiment. FIG. 3 is a functional block diagram illustrating an example of a functional configuration of a center server 100 (a processing device 120) according to the embodiment. FIG. 4 is a functional block diagram illustrating an example of a functional configuration of a terminal 200 (a processing device 220) according to the embodiment.

The remote startup system 1 includes the vehicle 2, the center server 100, and the terminal 200 carried by a user, and starts up an engine 30 and an air conditioning device 10 of the vehicle 2 to be described below according to a startup request that is transmitted from the terminal 200 to the center server 100.

The center server 100 provides a service for starting up the engine 30 and the air conditioning device 10 (hereinafter referred to as a "remote startup service") in response to a startup request that is transmitted from a user terminal, for a plurality of vehicles. The vehicle 2 representatively indicates one of a plurality of vehicles that is a target of the center server 100.

The vehicle 2 includes an air conditioning device 10, the air conditioner electronic control unit (ECU) 20, a room temperature sensor 21, an outside air temperature sensor 22, the engine 30, the engine ECU 40, and a data communication module (DCM) 90.

The air conditioning device 10 adjusts, for example, a temperature in the cabin of the vehicle 2. The air conditioning device 10 includes, for example, a refrigeration cycle including an evaporator (not illustrated) and a compressor (not illustrated) that is driven by the engine 30, and a heater (not illustrated) using coolant of the engine 30 as a heat source. Under the control of the air conditioner ECU 20 (the air conditioning controller 201 to be described below), the air conditioning device 10 adjusts the temperature of air sent out from an air outlet by appropriately setting a ratio of air cooled by passing through the evaporator (cold air) to air warmed using the coolant of the engine 30 as a heat source (hot air) in a changeable manner. The air conditioning device 10 has a defroster mode, and removes frost that is generated on the outside of a windshield of the vehicle 2 or fog generated on the cabin-side of the windshield of the vehicle 2 by sending air having a relatively low humidity and a relatively high temperature along the windshield of the vehicle 2 from the air outlet corresponding to the defroster mode.

The room temperature sensor 21 is provided in the cabin of the vehicle 2, such as the inside of an instrument panel (not illustrated), and detects a temperature in the cabin of the vehicle (room temperature of the vehicle). The room temperature sensor 21 is communicatably connected to the air conditioner ECU 20 via a one-to-one communication line or the like, and a detection signal corresponding to the detected room temperature of the vehicle is input to the air conditioner ECU 20.

The outside air temperature sensor 22 is provided on an outside of the vehicle 2 such as a front end portion of an engine compartment provided in a front portion of the vehicle 2 (a portion into which outside air is introduced), that is, on the back side of a front grille of the vehicle 2, and detects a temperature of the outside (outside air temperature) of the vehicle 2. The outside air temperature sensor 22 is communicatably connected to the air conditioner ECU 20 via a one-to-one communication line or the like, and a detection signal corresponding to the detected outdoor air temperature is input to the air conditioner ECU 20.

The air conditioner ECU 20 is an electronic control unit that performs various controls regarding the air conditioning device 10. The function of the air conditioner ECU 20 may be realized by any hardware, any software, or a combination thereof. The air conditioner ECU 20 may be mainly configured of, for example, a microcomputer including a central processing unit (CPU), a random access memory (RAM), a read only memory (ROM), an auxiliary storage device, an input-output interface (I/O), and the like. Hereinafter, the same applies to the engine ECU 40. The air conditioner ECU 20 includes, for example, an air conditioning controller 201 as a functional unit that is realized by executing one or more programs stored in a ROM, an auxiliary storage device, or the like on the CPU.

The air conditioning controller 201 controls an operation of the air conditioning device 10 according to a set state of a set temperature, a mode (a plurality of air outlet modes according to a combination of the air outlets or defroster mode), and the like. Specifically, the air conditioning controller 201 controls the operation of the air conditioning device 10, for example, so that the room temperature of the vehicle becomes the set temperature, based on a detected value of the room temperature sensor 21, the outside air temperature sensor 22, and the like. The air conditioning controller 201 starts up the air conditioning device 10 according to an air conditioning startup request from a remote operation assistance controller 402 to be described below and controls the operation of the air conditioning device 10 according to setting content included in the air conditioning startup request.

Various ECUs including the air conditioner ECU 20 and the engine ECU 40, and the DCM 90 are communicatably connected to each other over an in-vehicle network based on a communication protocol of a controller area network (CAN) or the like.

The engine 30 (an example of a driving device) is a driving force source of the vehicle 2, and is a driving force source of the air conditioning device 10, specifically, the compressor in the refrigeration cycle of the air conditioning device 10. The engine 30 is operated by burning gasoline, light oil, or the like supplied from a fuel tank (not illustrated) via a fuel pump (not illustrated) in a cylinder under the control of the engine ECU 40. The engine 30, specifically, various actuators (a fuel injection device that injects fuel, an ignition device that ignites gasoline injected into the cylinder, an electric motor for changing an opening and closing timing of an intake or exhaust valve, or the like) assembled in the engine 30 are communicatably connected to the engine ECU 40 via a one-to-one communication line or the like, and are operated according to a control command transmitted from the engine ECU 40.

The engine ECU 40 is an electronic control unit that performs various control processes of the engine 30 including a starter (not illustrated). The engine ECU 40 includes, for example, an engine controller 401, a remote operation assistance controller 402, and a communication availability determination unit 403 as functional units that are realized by executing one or more programs stored in a ROM, an auxiliary storage device, or the like.

The engine controller 401 (an example of a controller) performs operation control of the engine 30 according to an operation state by a driver of the vehicle 2 (for example, an accelerator operation amount or a selected gear shift stage of a transmission (not illustrated)), an environmental state of surroundings of the vehicle 2 (for example, an outside air temperature), or the like. For example, when an ignition switch (IG switch) is turned ON (IG-ON) or when an engine startup request is input from the outside, the engine controller 401 starts up the engine 30. Specifically, the engine controller 401 switches a relay (not illustrated) for energizing a starter to a connected state to drive the starter, and appropriately controls a fuel injection device and an ignition device according to cranking by the starter to start up the engine 30.

Even when the engine 30 is emergently stopped according to the engine stop request from the remote operation assistance controller 402 to be described below due to the communication disruption between the vehicle 2 and the center server 100, the engine controller 401 starts up the engine 30, for example, when an engine startup request based on a command other than the startup request from the terminal 200 is received. The engine startup request based on the command other than the startup request from the terminal 200 includes, for example, an engine startup request based on an ON operation of an ignition switch (an IG-ON operation) according to pressing of a power switch or an operation of a key inserted into a key cylinder, or an engine startup request based on a command from a remote control engine starter connected directly communicatably to the vehicle 2.

According to a startup request that is received from the terminal 200 via the center server 100, the remote operation assistance controller 402 transmits an engine startup request and an air conditioning startup request to the engine controller 401 and the air conditioning controller 201, respectively, to start up the engine 30 and the air conditioning device 10. When a predetermined end condition is satisfied after the engine 30 and the air conditioning device 10 are started up, the remote operation assistance controller 402 transmits an engine stop request and an air conditioning stop request to the engine controller 401 and the air conditioning controller 201, respectively, to stop the engine 30 and the air conditioning device 10. For example, when a set operation time included in the startup request or defined in advance has elapsed from the startup of the engine 30 and the air conditioning device 10 as an end condition, the remote operation assistance controller 402 may stop the engine 30 and the air conditioning device 10. For example, when the room temperature of the vehicle has been determined to have reached a set temperature included in the startup request or defined in advance after the startup of the engine 30 and the air conditioning device 10 as an end condition, the remote operation assistance controller 402 may stop the engine 30 and the air conditioning device 10. For example, when a signal indicating that an operation for stopping the engine 30 and the air conditioning device 10 is executed has been received from the terminal 200 via the center server 100 by the DCM 90 as an end condition, the remote operation assistance controller 402 may stop the engine 30 and the air conditioning device 10.

When the engine 30 and the air conditioning device 10 are started up based on the startup request from the terminal 200 and being operated, the remote operation assistance controller 402 (an example of a stop unit) determines a communication state between the vehicle 2 and the center server 100 based on the determination result of the communication availability determination unit 403. When the remote operation assistance controller 402 determines that the communication between the vehicle 2 and the center server 100 has been disrupted, the remote operation assistance controller 402 transmits an engine stop request and an air conditioning stop request to the engine controller 401 and the air conditioner ECU 20 to emergently stop the engine 30 and the air conditioning device 10. Accordingly, even when the communication between the vehicle 2 and the center server 100 is disrupted and a remote operation of the vehicle 2 cannot be performed from the terminal 200 via the center server 100, it is possible to safely stop the engine 30.

The function of the remote operation assistance controller 402 may be provided in the air conditioner ECU 20 or may be provided in another ECU that can communicate with the air conditioner ECU 20 and the engine ECU 40 via an in-vehicle network based on a communication protocol such as a CAN.

The communication availability determination unit 403 determines whether or not the communication is available between the vehicle 2 and the center server 100 via the DCM 90. For example, the communication availability determination unit 403 transmits a response request signal to the center server 100 via the DCM 90, and determines whether or not the communication with the center server 100 is available according to whether or not a response signal from the center server 100 is received by the DCM 90 in response to the response request signal.

The function of the communication availability determination unit 403 may be provided in the air conditioner ECU 20 or may be provided in another ECU that can communicate with the air conditioner ECU 20 and the engine ECU 40 via an in-vehicle network based on a communication protocol such as a CAN.

The DCM 90 is, for example, a communication device that bidirectionally communicates with the center server 100 over a predetermined communication network NW1 including a mobile phone network including a plurality of base stations as ends, an Internet network, or the like (hereinafter, the sample applies to a communication network NW2). As described above, the DCM 90 is mutually communicatably connected to various ECUs such as the air conditioner ECU 20 and the engine ECU 40 over an in-vehicle network such as a CAN.

The center server 100 is interposed between the vehicle 2 and the terminal 200 of the user, and performs control regarding a remote operation of the vehicle 2 using the terminal 200 by the user, specifically, control regarding the startup of the engine 30 of the vehicle 2 based on a remote operation from the terminal 200. The center server 100 includes a communication device 110 and a processing device 120.

The communication device 110 is a device that bidirectionally communicates with the vehicle 2 (specifically, the DCM 90) and the terminal 200 over the communication networks NW1 and NW2 under the control of the processing device 120 (specifically, the communication processing unit 1201).

The processing device 120 executes various control processes in the center server 100. The function of the processing device 120 may be realized by any hardware, any software, or a combination thereof. For example, the processing device 120 may be mainly configured of one or a plurality of server computers each including a CPU, a RAM, a ROM, an auxiliary storage device, an I/O, and the like. The processing device 120 includes, for example, a communication processing unit 1201, a remote operation controller 1202, and a response signal transmission unit 1203, as functional units that are realized by executing one or more programs stored in the ROM or the auxiliary storage device on the CPU.

The communication processing unit 1201 controls the communication device 110 to transmit and receive various signals (control signals, information signals, or the like) to and from the vehicle 2 and the terminal 200.

The remote operation controller 1202 performs control regarding the startup of the engine 30 and the air conditioning device 10 based on the startup request received from the terminal 200 by the communication processing unit 1201. For example, when the startup request from the terminal 200 is received by the communication processing unit 1201, the remote operation controller 1202 transmits the startup request to the vehicle 2 via the communication processing unit 1201 and starts the engine 30 and the air conditioning device 10.

In a case where the response request signal from the vehicle 2 is received by the communication processing unit 1201, the response signal transmission unit 1203 transmits a predetermined response signal to the vehicle 2 via the communication processing unit 1201.

The terminal 200, for example, transmits the startup request for the engine 30 according to a predetermined operation input from the user to perform a remote operation regarding the startup of the vehicle 2. The terminal 200 is, for example, a mobile terminal such as a smartphone or a tablet terminal carried by a user of the vehicle 2. The terminal 200 may be a stationary terminal carried by the user of the vehicle 2, such as a desktop type computer terminal. The terminal 200 includes a communication device 210, a processing device 220, and a touch panel display (hereinafter simply referred to as a "display") 240.

The communication device 210 is a device that performs bidirectional communication with the center server 100 over the communication network NW2 under the control of the processing device 220 (specifically, a communication processing unit 2201 to be described below) and is, for example, a Long Term Evolution (LTE) module.

The processing device 220 performs various control processes in the terminal 200. The processing device 220 may be mainly configured of, for example, a computer including a CPU, a RAM, a ROM, an auxiliary storage device, an I/O, and the like. The processing device 220 includes, for example, a communication processing unit 2201, a display controller 2202, and a remote operation unit 2203, as functional units that are realized by executing one or more programs stored in the ROM, the auxiliary storage device, or the like on the CPU.

The communication processing unit 2201 controls the communication device 210 and transmits and receives various signals to and from the center server 100.

The display controller 2202 displays various images on the display 240. For example, the display controller 2202 displays various graphical user interfaces (GUIs) as operation screens on the display 240.

The remote operation unit 2203 executes various processes regarding a remote operation of the engine 30 and the air conditioning device 10 according to a predetermined operation of the user with respect to a predetermined GUI displayed on the display 240 by the display controller 2202. A function of the remote operation unit 2203 becomes available, for example, by activating a predetermined application program (hereinafter referred to as "remote operation application") installed in the terminal 200 (the processing device 220) according to a predetermined operation of the user.

For example, the remote operation unit 2203 transmits various signals regarding the remote operation of the vehicle 2 including a startup request for requesting the startup of the engine 30 and the air conditioning device 10 to the center server 100 via the communication processing unit 2201 according to a predetermined operation of the user with respect to various GUIs displayed on the display 240 due to the startup of the remote operation application. Accordingly, a startup request transmitted to the center server 100 is received by the center server 100, the startup request is transmitted to the vehicle 2 under control of the center server 100 (specifically, the remote operation controller 1202), and the engine 30 and the air conditioning device 10 are started up. Further, the user can set various settings when operating the air conditioning device 10 on a predetermined GUI, and the remote operation unit 2203 transmits various signals such as a startup request including the various settings to the center server 100. Accordingly, in the vehicle 2, control of the air conditioning device 10 based on the setting content (for example, a set temperature as a requested value of the room temperature of the vehicle by the user, or a set operation time as a requested value of an operation time of the air conditioning device 10 by the user) is performed.

Detailed Operation of Remote Startup System

A specific operation of the remote startup system 1 according to the embodiment will be described with reference to FIG. 5A and FIG. 5B.

Figure 5A:
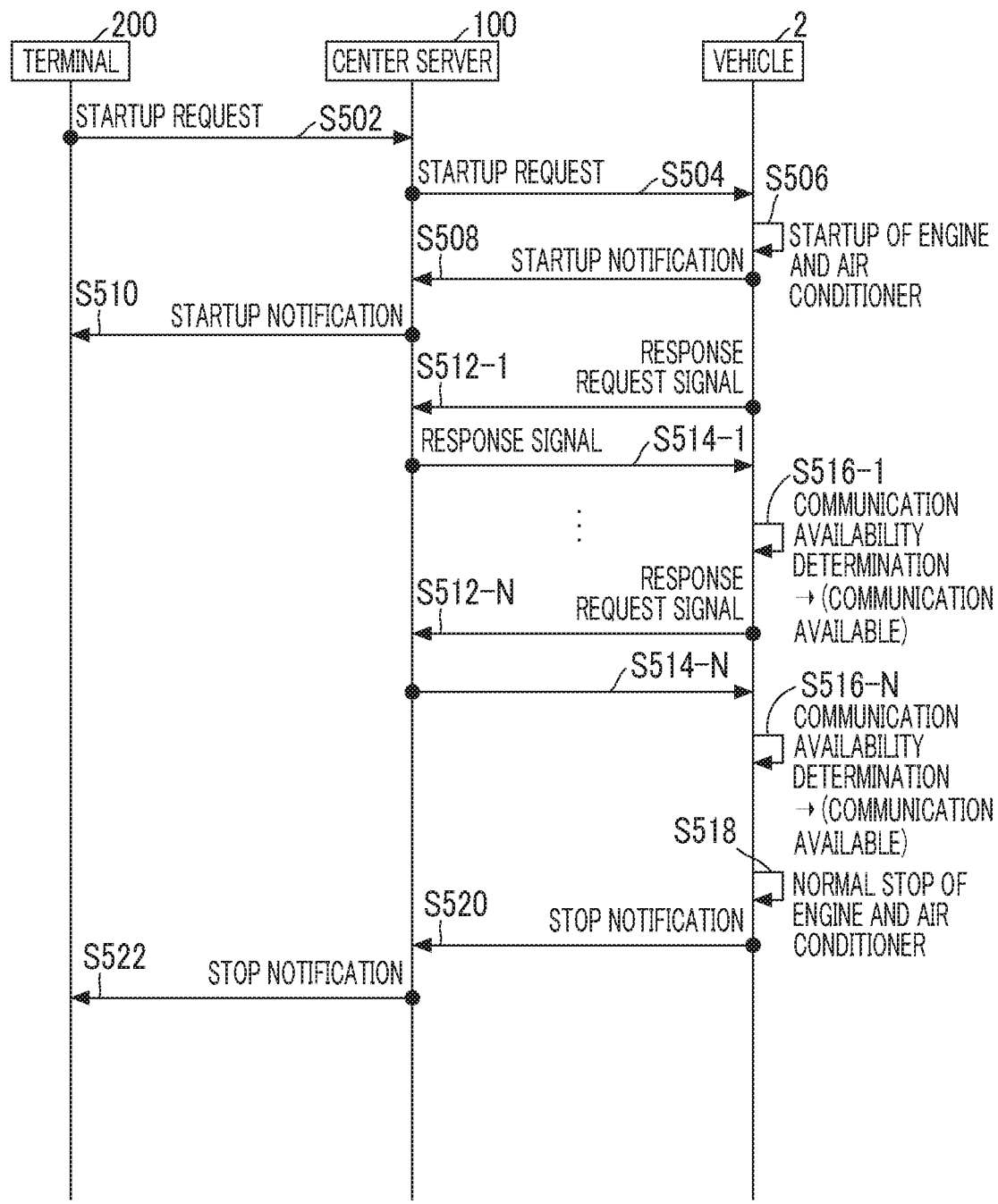
FIG. 5A is a sequence diagram schematically illustrating an example of an operation of the remote startup system according to the first embodiment.
Figure 5B:
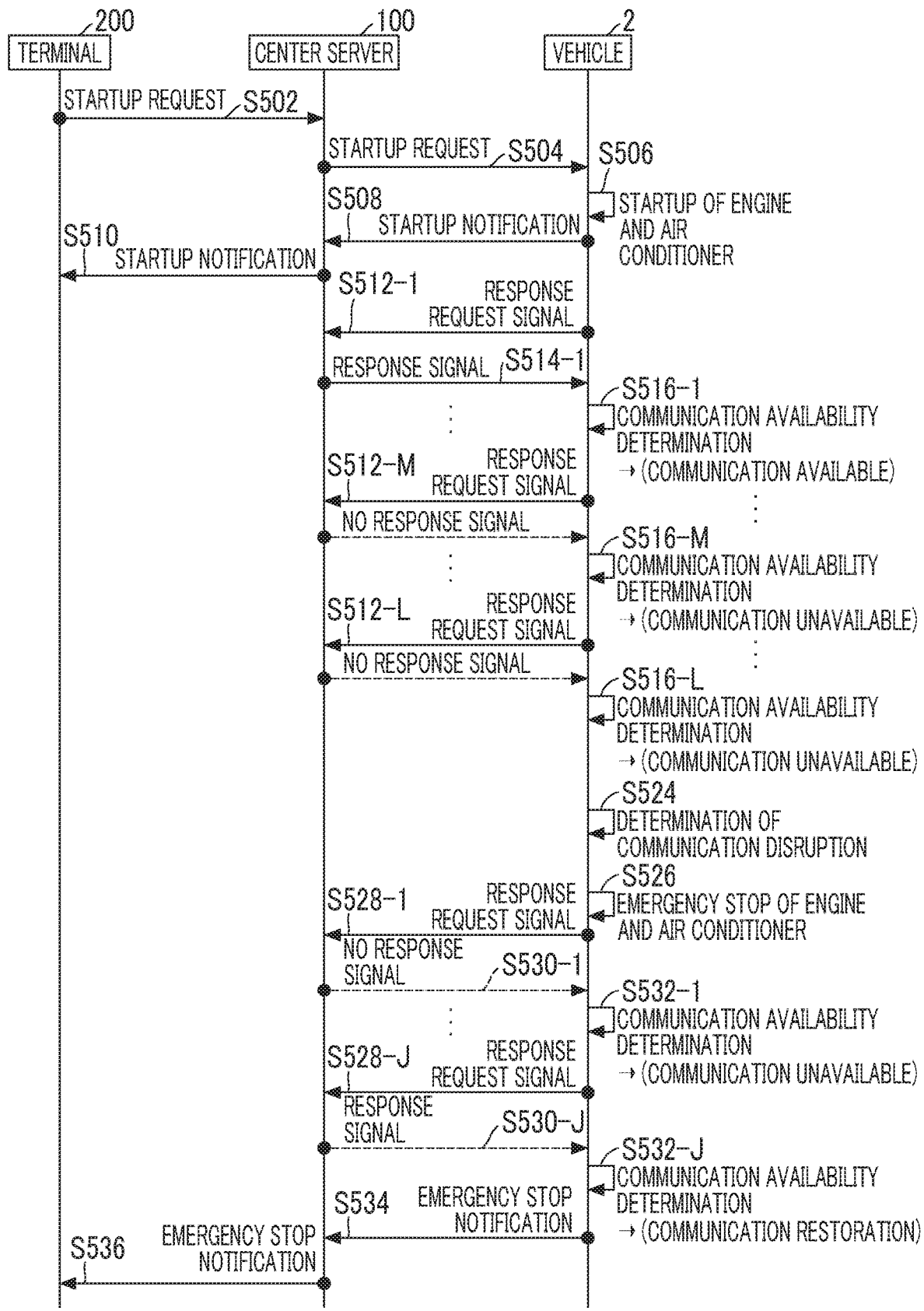
FIG. 5B is a sequence diagram schematically illustrating another example of the operation of the remote startup system according to the first embodiment.

FIG. 5A and FIG. 5B are sequence diagrams schematically illustrating an example and another example of the operation of the remote startup system 1 according to the embodiment. Specifically, FIG. 5A is a sequence diagram illustrating a specific example of the operation of the remote startup system 1 in a case where a communication state between the vehicle 2 and the center server 100 is normal. FIG. 5B is a sequence diagram illustrating an example of the operation of the remote startup system 1 in a case where the communication between the vehicle 2 and the center server 100 is disrupted.

In FIG. 5A and FIG. 5B, since steps S502 to S510 are the same, redundant description will be omitted.

Referring to FIG. 5A, in step S502, the remote operation unit 2203 of the terminal 200 transmits a startup request including various setting content (a set temperature, a set operation time, or the like) according to a predetermined operation with respect to the GUI by the user to the center server 100 via the communication processing unit 2201.

In step S504, when the startup request from the terminal 200 is received by the communication processing unit 1201, the remote operation controller 1202 of the center server 100 transfers the startup request to the vehicle 2 via the communication processing unit 1201.

In step S506, when the startup request from the center server 100 is received by the DCM 90, the remote operation assistance controller 402 of the vehicle 2 sends an engine startup request and an air conditioning startup request to the engine controller 401 and the air conditioner ECU 20 to start up the engine 30 and the air conditioning device 10.

In step S508, the remote operation assistance controller 402 of the vehicle 2 transmits a startup notification of the startup of the engine 30 and the air conditioning device 10 to the center server 100 via the DCM 90.

In step S510, when the startup notification from the vehicle 2 is received by the communication processing unit 1201, the remote operation controller 1202 of the center server 100 transfers the startup notification to the terminal 200 via the communication processing unit 1201.

In step S512, the communication availability determination unit 403 of the vehicle 2 periodically transmits a response request signal to the center server 100 via the DCM 90 during the operation of the engine 30 and the air conditioning device 10 after the startup of the engine 30 and the air conditioning device 10 based on the startup request.

Hereinafter, a step of transmitting a response request signal at each time, that is, an i-th (i is an integer equal to or greater than 1) response request signal is referred to as step S512-i.

In step S514, when the response request signal from the vehicle 2 is received by the communication processing unit 1201, the response signal transmission unit 1203 of the center server 100 replies the vehicle 2 with a response signal via the communication processing unit 1201. Hereinafter, a step of replying with the response signal corresponding to the step of transmitting the i-th response request signal will be referred to as step S514-i.

In step S516, the communication availability determination unit 403 of the vehicle 2 determines a communication availability state between the vehicle 2 and the center server 100 according to whether or not the response signal is received by the DCM 90 within a predetermined time from the transmission of the response request signal. Hereinafter, the communication availability determination step corresponding to the step of transmitting the i-th response request signal is referred to as step S516-i.

In this example, the response signal is replied from the center server 100 to the vehicle 2 in response to all of the response request signals transmitted from the vehicle 2 to the center server 100 at each time of steps S512-1 to S512-N (N is an integer equal to or greater than 2) (steps S514-1 to S514-N). Therefore, the communication availability determination unit 403 of the vehicle 2 determines that communication is available between the vehicle 2 and the center server 100 in all of steps S516-1 to S516-N.

In step S518, when the end condition is satisfied, the remote operation assistance controller 402 of the vehicle 2 transmits an engine stop request and an air conditioning stop request to the engine controller 401 and the air conditioner ECU 20 to stop the engine 30 and the air conditioning device 10 (normal stop).

In step S520, the remote operation assistance controller 402 of the vehicle 2 transmits a stop notification indicating the stop of the engine 30 and the air conditioning device 10 to the center server 100 via the DCM 90.

In step S522, when the stop notification is received from the vehicle 2 via the communication processing unit 1201, the remote operation controller 1202 of the center server 100 transfers the stop notification to the terminal 200 via the communication processing unit 1201.

On the other hand, referring to FIG. 5B, in this example, the response signal is not replied from the center server 100 to the vehicle 2 with respect to the response request signal transmitted from the vehicle 2 to the center server 100 at each time of steps S512-M to S512-L (M and L are integers equal to or greater than 2 and satisfying a relationship of M<L). Therefore, the communication availability determination unit 403 of the vehicle 2 determines that communication between the vehicle 2 and the center server 100 is disabled, that is, communication is disrupted at each time of steps S516-M to S516-L.

In step S524, since an elapsed time from the communication disruption between the vehicle 2 and the center server 100 exceeds a predetermined threshold value, the remote operation assistance controller 402 of the vehicle 2 determines that communication between the vehicle 2 and the center server 100 has been disrupted. The predetermined threshold value is appropriately defined as a value for discriminating between a temporary communication disruption state and a communication disruption continued to a certain extent.

In step S526, the remote operation assistance controller 402 of the vehicle 2 transmits an engine stop request and an air conditioning stop request to the engine controller 401 and the air conditioner ECU 20 to emergently stop the engine 30 and the air conditioning device 10.

In step S528, the communication availability determination unit 403 of the vehicle 2 periodically transmits the response request signal to the center server 100 via the DCM 90 and confirms whether or not the communication has been restored during a predetermined period of time after the engine 30 and the air conditioning device 10 are emergently stopped. Hereinafter, the step of transmitting a response request signal at each time, that is, the j-th (j is an integer equal to or greater than 1) response request signal is referred to as step S528-j.

In step S530, when the response request signal from the vehicle 2 is received by the communication processing unit 1201, the response signal transmission unit 1203 of the center server 100 replies the vehicle 2 with the response signal via the communication processing unit 1201. Hereinafter, the step of replying with the response signal corresponding to the step of transmitting the j-th response request signal is referred to as step S530-j.

In step S532, the communication availability determination unit 403 of the vehicle 2 determines a communication availability state between the vehicle 2 and the center server 100 according to whether or not the response signal is received by the DCM 90 within a predetermined time from the transmission of the response request signal. Hereinafter, the communication availability determination step corresponding to the step of transmitting the j-th response request signal is referred to as step S532-j.

In this example, a response signal is replied from the center server 100 to the vehicle 2 in response to the response request signal transmitted from the vehicle 2 to the center server 100 in step S528-J (J is an integer equal to or greater than 2) (step S530-J). Therefore, in step S532-J, the communication availability determination unit 403 of the vehicle 2 determines that the communication is available between the vehicle 2 and the center server 100, that is, the communication has been restored.

In step S534, the remote operation assistance controller 402 of the vehicle 2 transmits a notification indicating the emergency stop of the engine 30 and the air conditioning device 10 (emergency stop notification) to the center server 100 via the DCM 90 (an example of a stop notification transmission unit) according to the restoration of the communication. Accordingly, it is possible for the center server 100 to recognize that the engine 30 and the air conditioning device 10 have been stopped according to the communication disruption between the vehicle 2 and the center server 100.

In step S536, when the emergency stop notification from the vehicle 2 is received by the communication processing unit 1201, the remote operation controller 1202 of the center server 100 transfers the emergency stop notification to the terminal 200 via the communication processing unit 1201. Accordingly, the user of the terminal 200 can recognize that the engine 30 and the air conditioning device 10 have been stopped according to the communication disruption between the vehicle 2 and the center server 100.

Operation

As described above, in the embodiment, in a case where the engine 30 is started up based on the startup request and being operated, the remote operation assistance controller 402 of the vehicle 2 stops the engine 30 when the communication between the center server 100 and the vehicle 2 is disrupted.

Accordingly, in a case where the engine 30 is started up based on the startup request and being operated, the engine 30 is automatically stopped when the communication between the center server 100 and the vehicle 2 is disrupted. Therefore, even in a case where an operation for stopping the engine 30 of the vehicle 2 from the terminal 200 cannot be performed due to the communication disruption while the engine 30 is being started up based on the startup request and being operated, the engine 30 can be safely stopped.

In the embodiment, the communication availability determination unit 403 of the vehicle 2 transmits the response request signal to the center server 100, and determines whether or not communication is available between the center server 100 and the vehicle 2 based on the presence or absence of a reply (response signal) from the center server 100 in response to the response request signal.

Accordingly, it is possible to specifically determine whether or not communication is available between the center server 100 and the vehicle 2 by periodically transmitting a request signal requesting the reply from the vehicle 2 to the center server 100.

In the embodiment, the remote operation assistance controller 402 of the vehicle 2 determines whether or not to stop the engine 30 according to a result of determining whether the communication is available between the center server 100 and the vehicle 2 in the communication availability determination unit 403 of the vehicle 2.

Accordingly, in a case where a determination is made that communication is not available according to the determination as to the communication availability through periodic transmission of the response request signal, a determination is made that the communication has been disrupted, and the engine 30 can be stopped.

In the embodiment, in a case where the remote operation assistance controller 402 of the vehicle 2 determines that the communication between the center server 100 and the vehicle 2 has been disrupted based on the determination result of the communication availability determination unit 403 of the vehicle 2 and an elapsed time of the disruption of the communication has exceeded a predetermined threshold value, the engine 30 may be stopped.

Accordingly, since the engine 30 is stopped after a certain time has elapsed from the disruption of the communication, a situation in which the engine 30 is stopped can be avoided, for example, in a case where the communication is temporarily disrupted and immediately restored.

In the embodiment, even when the communication between the center server 100 and the vehicle 2 is disrupted, the engine controller 401 of the vehicle 2 permits the startup of the engine 30 based on a command other than the startup request from the terminal 200.

Accordingly, even in a case where the engine 30 is stopped due to the occurrence of communication disruption, when the user goes near the vehicle 2, the engine 30 can be started up using a command other than the startup request transmitted from the terminal 200, such as an ON operation of the ignition switch of the vehicle 2 or a command from a remote control engine starter that directly transmits a command to the vehicle 2.

In the embodiment, in a case where the engine 30 is emergently stopped, and then, when the communication between the center server 100 and the vehicle 2 is restored, the remote operation assistance controller 402 of the vehicle 2 transmits a notification indicating the stop of the engine 30 (emergency stop notification) toward the terminal 200 via the DCM 90, that is, to the center server 100 with the terminal 200 as a destination.

Accordingly, when the engine 30 has been stopped due to the communication disruption, the fact that the engine 30 has actually been stopped is transmitted from the vehicle 2 to the terminal 200 via the center server 100 according to the restoration of the communication. Accordingly, the user can confirm that the engine 30 has actually been stopped according to, for example, the notification displayed on the display 240 of the terminal 200.

Second Embodiment

A second embodiment will be described.

A remote startup system 1 according to this embodiment is different from that according to the first embodiment in that a function of emergently stopping the engine 30 and the air conditioning device 10 (one function of the remote operation assistance controller 402) is provided in the center server 100. The remote startup system 1 according to the second embodiment is different from that according to the first embodiment in that the function of the communication availability determination unit 403 is provided in the center server 100 to determine the communication availability state between the terminal 200 and the center server 100. Hereinafter, the same or corresponding configurations as those of the first embodiment are denoted with the same reference numerals, and different portions will be mainly described.

Configuration of Remote Startup System

Figure 7:
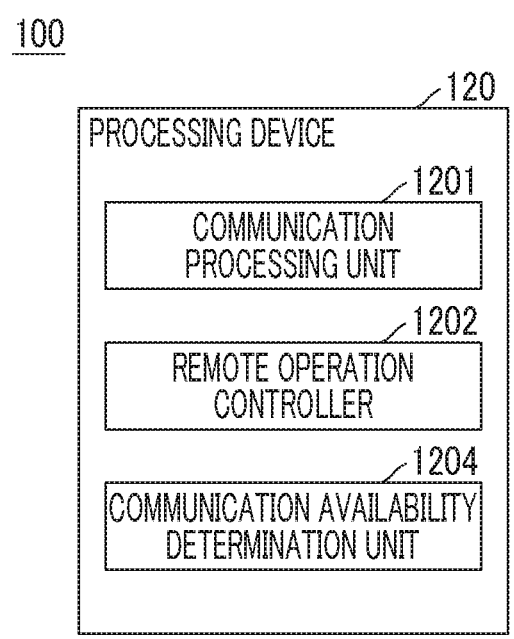
FIG. 7 is a functional block diagram illustrating an example of a functional configuration of a center server (a processing device) according to the second embodiment.
Figure 8:
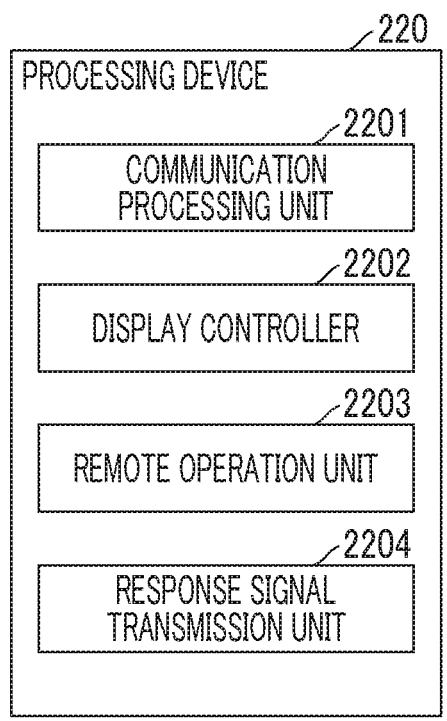
FIG. 8 is a functional block diagram illustrating an example of a functional configuration of a terminal (a processing device) according to the second embodiment.

First, the configuration of the remote startup system 1 according to the second embodiment will be described with reference to FIGS. 6 to 8.

Figure 6:
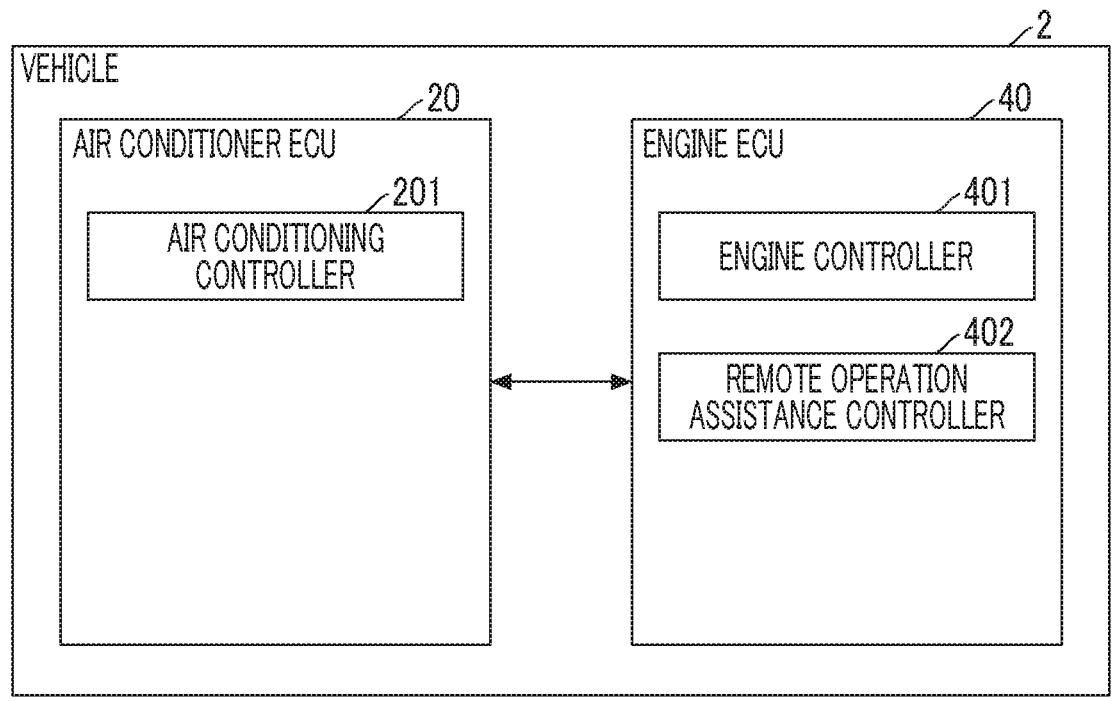
FIG. 6 is a functional block diagram illustrating an example of a functional configuration of a vehicle (an air conditioner ECU and an engine ECU) according to a second embodiment.

FIG. 6 is a functional block diagram illustrating an example of a functional configuration of a vehicle 2 (an air conditioner ECU 20 and an engine ECU 40) according to the embodiment. FIG. 7 is a functional block diagram illustrating an example of a functional configuration of a center server 100 (a processing device 120) according to the embodiment. FIG. 8 is a functional block diagram illustrating an example of a functional configuration of a terminal 200 (a processing device 220) according to the embodiment.

An overall configuration of the remote startup system 1 according to the embodiment is illustrated in FIG. 1.

The vehicle 2 includes an air conditioning device 10, an air conditioner ECU 20, a room temperature sensor 21, an outside air temperature sensor 22, an engine 30, an engine ECU 40, and a DCM 90, as in the first embodiment.

The engine ECU 40 includes, for example, an engine controller 401 and a remote operation assistance controller 402 as functional units that are realized by executing one or more programs stored in a ROM, an auxiliary storage device, or the like.

When the engine 30 and the air conditioning device 10 are started up based on the startup request from the terminal 200 and being operated, the remote operation assistance controller 402 transmits an engine stop request and an air conditioning stop request to the engine controller 401 and the air conditioner ECU 20 to emergently stop the engine 30 and the air conditioning device 10 in response to the emergency stop request received from the center server 100 by the DCM 90.

The center server 100 includes a communication device 110 and a processing device 120, as in the first embodiment.

The processing device 120 includes, for example, a communication processing unit 1201, a remote operation controller 1202, and a communication availability determination unit 1204 as functional units that are realized by executing one or more programs stored in a ROM or an auxiliary storage device on a CPU.

The communication availability determination unit 1204 determines whether or not communication is available between the center server 100 and the terminal 200. For example, the communication availability determination unit 1204 transmits a response request signal to the terminal 200 via the communication processing unit 1201, and determines whether or not the communication with the terminal 200 can be performed according to whether or not a response signal from the terminal 200 is received by the communication processing unit 1201 in response to the response request signal.

When the engine 30 and the air conditioning device 10 are started up based on the startup request from the terminal 200 and being operated, the remote operation controller 1202 (an example of a stop unit) determines a communication state between the center server 100 and the terminal 200 based on a determination result of the communication availability determination unit 1204. When the remote operation controller 1202 determines that the communication between the center server 100 and the terminal 200 has been disrupted, the remote operation controller 1202 transmits an emergency stop request to the vehicle 2 via the communication processing unit 1201. Accordingly, even when the communication between the center server 100 and the terminal 200 is disrupted and the remote operation of the vehicle 2 cannot be performed from the terminal 200 via the center server 100, the engine 30 can be safely stopped.

The terminal 200 includes a communication device 210, a processing device 220, and a display 240, as in the first embodiment.

The processing device 220 includes, for example, a communication processing unit 2201, a display controller 2202, a remote operation unit 2203, and a response signal transmission unit 2204 as functional units that are realized by executing one or more programs stored in a ROM, an auxiliary storage device, or the like on a CPU.

When a response request signal from the center server 100 is received by the communication processing unit 2201, the response signal transmission unit 2204 replies a predetermined response signal to the center server 100 via the communication processing unit 2201.

Detailed Operation of Remote Startup System 1

A specific operation of the remote startup system 1 according to the embodiment will be described with reference to FIG. 9A and FIG. 9B.

Figure 9A:
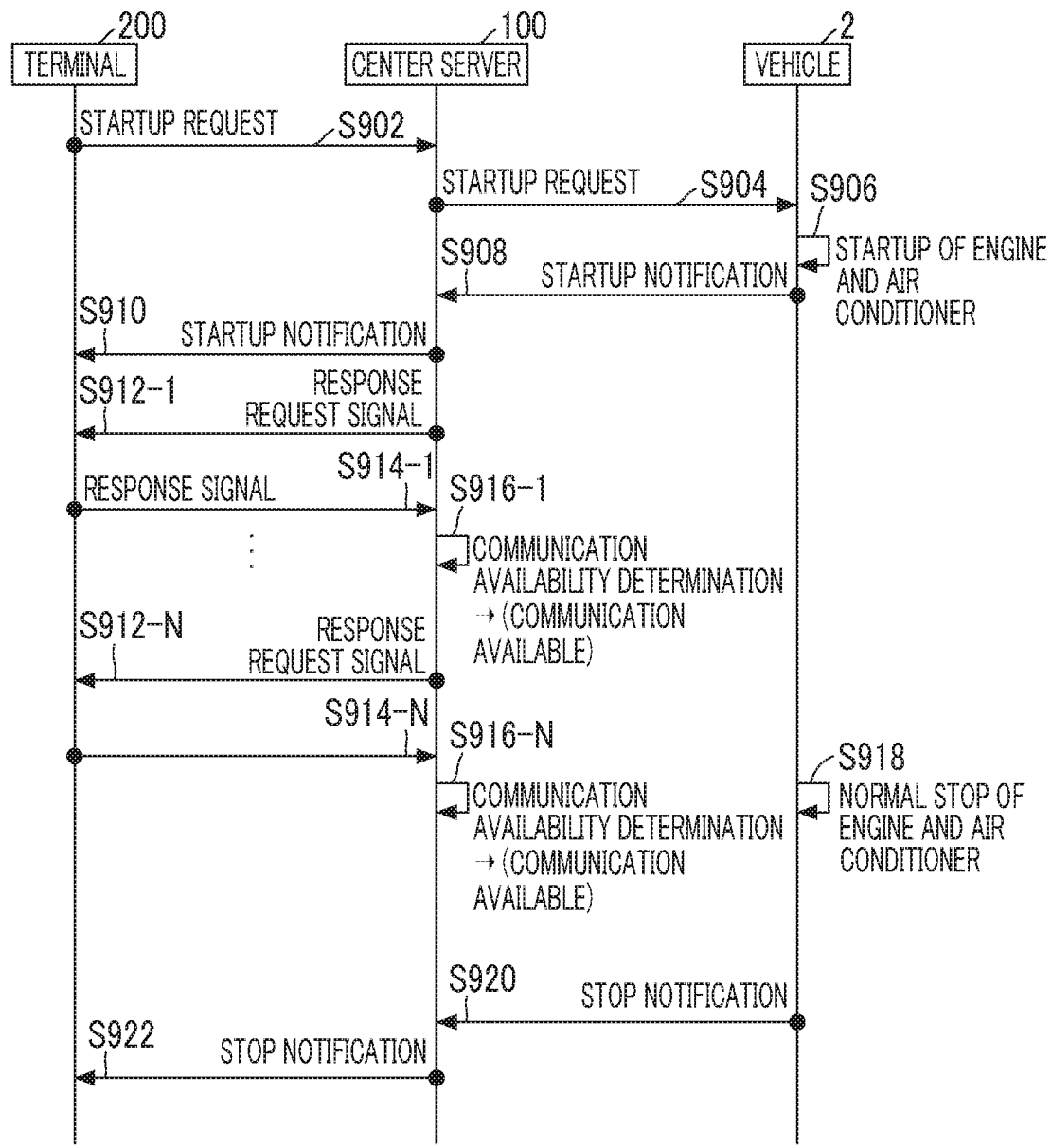
FIG. 9A is a sequence diagram schematically illustrating an example of an operation of the remote startup system according to the second embodiment.
Figure 9B:
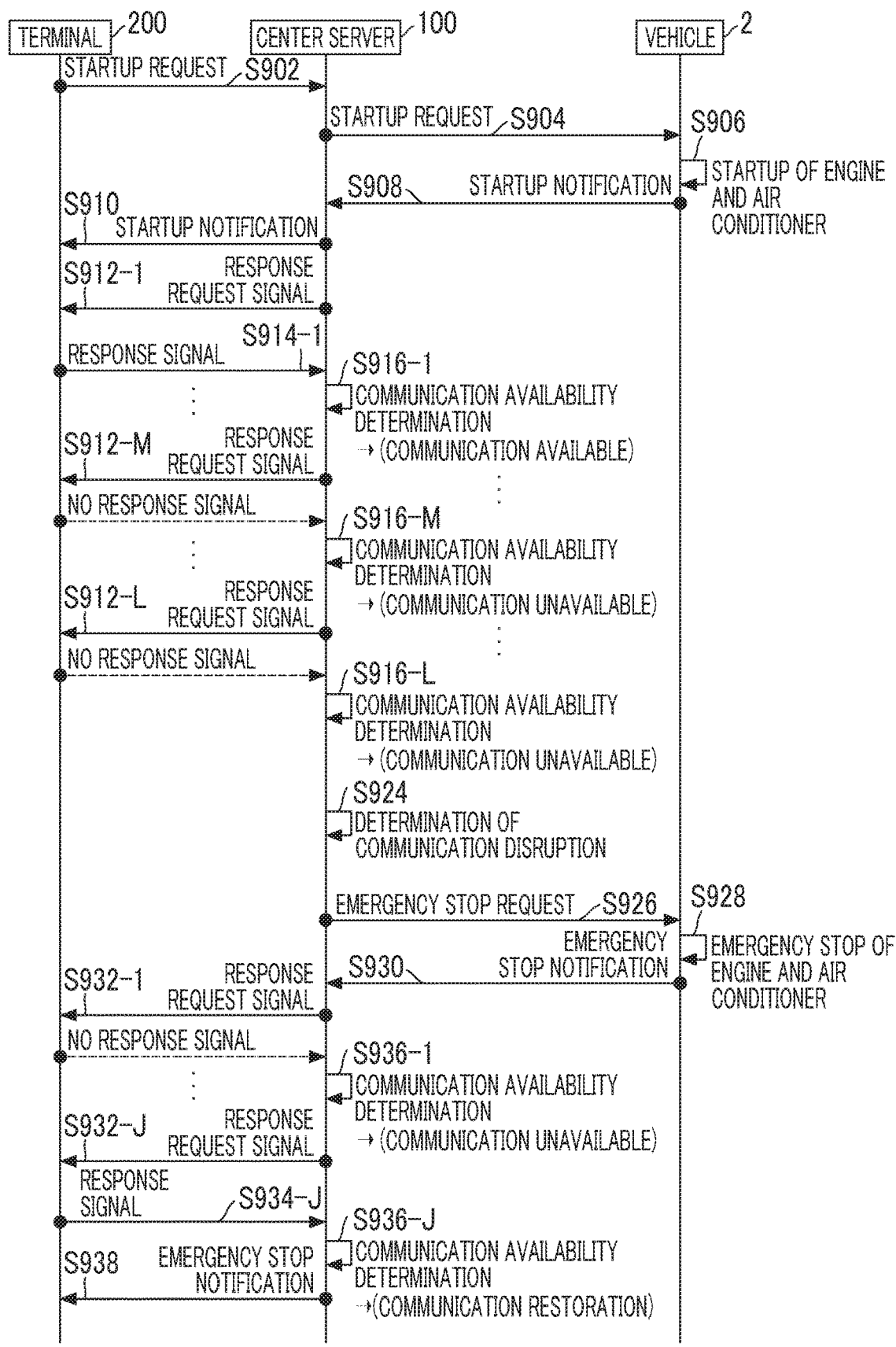
FIG. 9B is a sequence diagram schematically illustrating another example of the operation of the remote startup system according to the second embodiment.

FIG. 9A and FIG. 9B are sequence diagrams schematically illustrating an example and another example of the operation of the remote startup system 1 according to the embodiment. Specifically, FIG. 9A is a sequence diagram illustrating a specific example of the operation of the remote startup system 1 in a case where the communication state between the center server 100 and the terminal 200 is normal. FIG. 9B is a sequence diagram illustrating an example of the operation of the remote startup system 1 in a case where the communication between the center server 100 and the terminal 200 has been disrupted.

Since Steps S902 to S910 in FIG. 9A and FIG. 9B are the same as steps S502 to S510 in FIG. 5A and FIG. 5B in the first embodiment, description thereof is omitted.

In step S912, the communication availability determination unit 1204 of the center server 100 periodically transmits the response request signal to the terminal 200 via the communication processing unit 1201 during an operation of the engine 30 and the air conditioning device 10 after the startup of the engine 30 and the air conditioning device 10 based on the startup request, specifically, between the reception of the startup notification from the vehicle 2 by the communication processing unit 1201 and the reception of the stop notification. Hereinafter, the step of transmitting a response request signal at each time, that is, a k-th (k is an integer equal to or greater than 1) is referred to as step S912-$k$.

In step S914, when the response request signal from the center server 100 is received by the communication processing unit 2201, the response signal transmission unit 2204 of the terminal 200 replies the center server 100 with a response signal via the communication processing unit 2201. Hereinafter, a step of replying a response signal corresponding to the step of transmitting a k-th response request signal is referred to as step S914-$k$.

In step S916, the communication availability determination unit 1204 of the center server 100 determines a communication availability state between the center server 100 and the terminal 200 according to whether or not the response signal is received by the communication processing unit 1201 within a predetermined time from the transmission of the response request signal. Hereinafter, a communication availability determination step corresponding to the step of transmitting a k-th response request signal is referred to as step S916-$k$.

In this example, a response signal is replied from the terminal 200 to the center server 100 in response to all of the response request signals transmitted from the center server 100 to the terminal 200 at each time of steps S912-1 to S912-N(N is an integer equal to or greater than 2) (steps S914-1 to S914-N). Therefore, the communication availability determination unit 1204 of the center server 100 determines that communication is available between the center server 100 and the terminal 200 in all of steps S916-1 to S916-N.

In step S918, when the end condition is satisfied, the remote operation assistance controller 402 of the vehicle 2 transmits an engine stop request and an air conditioning stop request to the engine controller 401 and the air conditioner ECU 20 to stop the engine 30 and the air conditioning device 10 (normal stop).

In step S920, the remote operation assistance controller 402 of the vehicle 2 transmits a stop notification indicating the stop of the engine 30 and the air conditioning device 10 to the center server 100 via the DCM 90.

In step S922, when the stop notification is received from the vehicle 2 via the communication processing unit 1201, the remote operation controller 1202 of the center server 100 transfers the stop notification to the terminal 200 via the communication processing unit 1201.

On the other hand, referring to FIG. 9B, in this example, the response signal is not replied from the terminal 200 to the center server 100 in response to the response request signal transmitted from the center server 100 to the terminal 200 at each time of steps S912-M to S912-L (M and L are integers equal to or greater than 2 and satisfying a relationship of M<L). Therefore, at each time of steps S916-M to S916-L, the communication availability determination unit 1204 of the center server 100 determines that communication is not available between the center server 100 and the terminal 200 is disabled, that is, the communication is disrupted.

In step S924, the remote operation controller 1202 of the center server 100 determines that the communication between the center server 100 and the terminal 200 is disrupted since the elapsed time from the communication disruption between the center server 100 and the terminal 200 has exceeded a predetermined threshold value. The predetermined threshold value is appropriately defined, as in the first embodiment.

In step S926, the remote operation controller 1202 of the center server 100 transmits an emergency stop request for emergency stop of the engine 30 and the air conditioning device 10 to the vehicle 2 via the communication processing unit 1201.

In step S928, when the emergency stop request from the center server 100 is received by the DCM 90, the remote operation assistance controller 402 of the vehicle 2 transmits an engine stop request and an air conditioning stop request to the engine controller 401 and the air conditioner ECU 20 to emergently stop the engine 30 and the air conditioning device 10.

In step S930, the remote operation assistance controller 402 of the vehicle 2 transmits a notification indicating the emergency stop of the engine 30 and the air conditioning device 10 (emergency stop notification) to the center server 100 via the DCM 90. Accordingly, it is possible for the center server 100 to recognize that the engine 30 and the air conditioning device 10 have been stopped according to the communication disruption between the center server 100 and the terminal 200.

In step S932, the communication availability determination unit 1204 of the center server 100 periodically transmits the response request signal to the terminal 200 via the communication processing unit 1201 to confirm whether or not the communication has been restored, during a predetermined period of time after the emergency stop of the engine 30 and the air conditioning device 10, specifically, after the emergency stop notification has been received by the communication processing unit 1201. Hereinafter, the step of transmitting the response request signal at each time, that is, the m-th (m is an integer equal to or greater than 1) response request signal is referred to as step S932-$m$.

In step S934, when the response request signal from the center server 100 is received by the communication processing unit 2201, the response signal transmission unit 2204 of the terminal 200 replies the center server 100 with the response signal via the communication processing unit 2201. Hereinafter, the step of replying the response signal corresponding to the step of transmitting the m-th response request signal is referred to as step S934-$m$.

In step S936, the communication availability determination unit 1204 of the center server 100 determines a communication availability state between the center server 100 and the terminal 200 according to whether or not the response signal from the terminal 200 is received by the communication processing unit 1201 within a predetermined time from the transmission of the response request signal. Hereinafter, the communication availability determination step corresponding to the step of transmitting the m-th response request signal is referred to as step S936-$m$.

In this example, the response signal is replied from the terminal 200 to the center server 100 in response to the response request signal transmitted from the center server 100 to the terminal 200 in step S932-J (J is an integer equal to or greater than 2) (step S934-J). Therefore, in step S936-J, the communication availability determination unit 1204 of the center server 100 determines that the communication is available between the center server 100 and the terminal 200, that is, the communication has been restored.

In step S938, the remote operation controller 1202 of the center server 100 transmits an emergency stop notification to the terminal 200 via the communication processing unit 1201 (an example of a stop notification transmission unit) according to the communication restoration. Accordingly, the user of the terminal 200 can recognize that the engine 30 and the air conditioning device 10 have been stopped according to the communication disruption between the center server 100 and the terminal 200.

Operation

As described above, in the embodiment, in a case where the engine 30 and the air conditioning device 10 are started up based on the startup request and being operated, the remote operation controller 1202 of the center server 100 stops the engine 30 when communication between the terminal 200 and the center server 100 has been disrupted.

Accordingly, in a case where the engine 30 and the air conditioning device 10 are started up based on the startup request and being operated, the engine 30 is automatically stopped when the communication between the terminal 200 and the center server 100 has been disrupted. Therefore, even in a case where the operation of stopping the engine 30 of the vehicle 2 cannot be performed from the terminal 200 due to the communication disruption while the engine 30 and the air conditioning device 10 are being started up based on the startup request and being operated, it is possible to safely stop the engine 30.

In the embodiment, the communication availability determination unit 1204 of the center server 100 periodically transmits the response request signal to the terminal 200, and determines whether or not the communication is available between the terminal 200 and the center server 100 based on presence or absence of a reply (a response signal) from the terminal 200 in response to the response request signal.

Thus, by periodically transmitting the response request signal for requesting the reply from the center server 100 to the terminal 200, it is possible to specifically determine whether or not the communication is available between the terminal 200 and the center server 100.

In the embodiment, the remote operation controller 1202 of the center server 100 determines whether or not the engine 30 is to be stopped based on a determination result of the communication availability determination unit 1204 of the center server 100 as to whether or not the communication is available between the terminal 200 and the center server 100.

Accordingly, when a determination is made that communication is unavailable between the terminal 200 and the center server 100 according to the communication availability determination due to periodic transmission of the response request signal, a determination is made that the communication has been disrupted and the engine 30 can be stopped.

In the embodiment, the remote operation controller 1202 of the center server 100 may stop the engine 30 in a case where the remote operation controller 1202 of the center server 100 has determined that the communication between the terminal 200 and the center server 100 has been disrupted based on the determination result of the communication availability determination unit 1204 of the center server 100 and the elapsed time from the disruption of the communication has exceeded the predetermined threshold value.

Accordingly, since the engine 30 is stopped after a certain time has elapsed from the disruption of the communication, a situation in which the engine 30 is stopped can be avoided, for example, in a case where the communication is temporarily disrupted and immediately restored.

In the embodiment, the remote operation controller 1202 of the center server 100 transmits a notification indicating that the engine 30 has been stopped to the terminal 200 via the communication processing unit 1201 in a case where the engine 30 has emergently been stopped and then when the communication between the terminal 200 and the center server 100 has been restored.

Thus, since the fact that the engine 30 has actually been stopped is transmitted from the center server 100 to the terminal 200 according to the restoration of communication in a case where the engine 30 has been stopped due to the communication disruption, the user can confirm that the engine 30 has actually been stopped from, for example, the notification displayed on the display 240 of the terminal 200.

Although the modes for carrying out the present disclosure has been described in detail above, the present disclosure is not limited to the specific embodiments described above, and various modifications and changes can be made.

For example, although the engine 30 serving as the driving device that drives the air conditioning device 10 (the compressor) is a startup target in the embodiments described above, another driving device may be the startup target. For example, in a case where the vehicle 2 is an electric vehicle, an electric compressor, specifically, an electric motor (another example of the driving device) built into the electric compressor may be the startup target.

What is claimed is:

1. A remote startup system comprising:
   a terminal;
   a center server configured to communicate with the terminal and receive a startup request from the terminal; and
   a vehicle on which a driving device is mounted, the vehicle being configured to
     communicate with the center server,
     receive the startup request from the center server, and start up the driving device,
     wherein at least one of the center server and the vehicle includes
   an electronic control unit (ECU) including a central processing unit (CPU), a random access memory (RAM), a read only memory (ROM), the ECU being configured to
     stop the driving device of the vehicle when communication between the terminal and the center server or between the center server and the vehicle is disrupted in a case where the driving device is started up based on the startup request and being operated and
     determine whether or not communication is available between the terminal and the center server or between the center server and the vehicle, and
   a communication interface configured to, after the communication is disrupted, transmit a stop notification to the terminal in response to a determination by the ECU that the communication is available, the stop notification indicating that the driving device is stopped due to a disruption of the communication.

2. The remote startup system according to claim 1, wherein:
   in a case where the ECU is provided in the center server, the ECU is configured to transmit periodically a request signal to the terminal, and determine whether or not communication is available between the terminal and the center server based on a presence or absence of a reply from the terminal in response to the request signal; and
   in a case where the ECU is provided in the vehicle, the ECU is configured to transmit a request signal to the center server, and determine whether or not communication is available between the center server and the vehicle based on a presence or absence of a reply from the center server in response to the request signal.

3. The remote startup system according to claim 2, wherein the ECU is configured to determine whether or not to stop the driving device of the vehicle based on a determination result of the engine ECU as to whether or not communication is available between the terminal and the center server or between the center server and the vehicle.

4. The remote startup system according to claim 3, wherein the ECU is configured to stop the driving device of the vehicle in a case where the remote operation controller determines that the communication between the terminal and the center server or between the center server and the vehicle is disrupted based on the determination result of the engine ECU and an elapsed time of the disruption of the communication has exceeded a predetermined threshold value.

5. The remote startup system according to claim 1, wherein:
   the vehicle includes a controller configured to start up the driving device; and
   the controller is configured to permit startup of the driving device based on a command other than the startup request even in a case where the communication between the terminal and the center server or between the center server and the vehicle is disrupted.

6. The remote startup system according to claim 1, wherein the communication interface is configured to transmit a notification indicating that the driving device is stopped to the terminal when communication between the terminal and the center server or between the center server and the vehicle is restored in a case where the driving device is stopped by the ECU.

7. A center server communicatively connected to a terminal and a vehicle, the center server being configured to receive a startup request that is transmitted from the terminal and start up a driving device mounted on the vehicle based on the startup request, the center server comprising:
   an electronic control unit (ECU) including a central processing unit (CPU), a random access memory (RAM), a read only memory (ROM), the ECU being configured to
     transmit a stop request to the vehicle and stop the driving device of the vehicle when communication between the terminal and the center server is disrupted in a case where the driving device is started up based on the startup request and being operated and
     determine whether or not communication is available between the terminal and the center server or between the center server and the vehicle; and
   a communication interface configured to, after the communication is disrupted, transmit a stop notification to the terminal in response to a determination by the ECU that the communication is available, the stop notification indicating that the driving device is stopped due to a disruption of the communication.

8. A vehicle communicatively connected to a center server that is communicable with a terminal, the vehicle being configured to start up a driving device mounted on the vehicle in response to a predetermined response signal from the center server based on a startup request transmitted from the terminal to the center server, the vehicle comprising:
   an electronic control unit (ECU) including a central processing unit (CPU), a random access memory (RAM), a read only memory (ROM), the ECU being configured to stop the driving device of the vehicle when communication between the center server and the vehicle is disrupted in a case where the driving device is started up based on the startup request and being operated and determine whether or not communication is available between the terminal and the center server or between the center server and the vehicle; and a communication interface configured to, after the communication is disrupted, transmit a stop notification to the terminal in response to a determination by the ECU that the communication is available, the stop notification indicating that the driving device is stopped due to a disruption of the communication.

9. A remote startup method that is executed by a remote startup system including a terminal, a center server communicable with the terminal, and a vehicle communicable with the center server, the remote startup system being configured to start up a driving device mounted on the vehicle in response to a startup request transmitted from the terminal to the center server, the remote startup method comprising:

stopping the driving device of the vehicle when communication between the terminal and the center server or between the center server and the vehicle is disrupted in a case where the driving device is started up based on the startup request and being operated;

determining whether or not communication is available between the terminal and the center server or between the center server and the vehicle; and transmitting, after the communication is disrupted, a stop notification to the terminal in response to a determination by the ECU that the communication is available, the stop notification indicating that the driving device is stopped due to a disruption of the communication.

* * * * *